(12) United States Patent
Lee et al.

(10) Patent No.: US 12,318,751 B2
(45) Date of Patent: Jun. 3, 2025

(54) METHOD FOR MANUFACTURING A GRANULAR ADSORBENT FOR SEPARATING CARBON MONOXIDE OR CARBON DISULFIDE

(71) Applicant: INDUSTRY-ACADEMIC COOPERATION FOUNDATION, YONSEI UNIVERSITY, Seoul (KR)

(72) Inventors: Chang-Ha Lee, Seoul (KR); Gina Bang, Seoul (KR); Xuan Canh Nguyen, Seoul (KR); Jun Ho Kang, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 359 days.

(21) Appl. No.: 17/548,970

(22) Filed: Dec. 13, 2021

(65) Prior Publication Data

US 2022/0184578 A1    Jun. 16, 2022

(30) Foreign Application Priority Data

Dec. 14, 2020 (KR) .................. 10-2020-0174516
Dec. 13, 2021 (KR) .................. 10-2021-0177263

(51) Int. Cl.
| | |
|---|---|
| *B01J 20/02* | (2006.01) |
| *B01D 53/02* | (2006.01) |
| *B01J 20/28* | (2006.01) |
| *B01J 20/32* | (2006.01) |

(52) U.S. Cl.
CPC .......... *B01J 20/0233* (2013.01); *B01D 53/02* (2013.01); *B01J 20/28004* (2013.01); *B01J 20/28016* (2013.01); *B01J 20/2808* (2013.01); *B01J 20/28083* (2013.01); *B01J 20/3204* (2013.01); *B01D 2253/1122* (2013.01); *B01D 2257/30* (2013.01); *B01D 2257/502* (2013.01)

(58) Field of Classification Search
CPC .. B01J 20/02; B01J 20/0233; B01J 20/28004; B01J 20/28016; B01J 20/2808; B01J 20/28083; B01J 20/3204; B01D 53/02; B01D 2253/1122; B01D 2257/30; B01D 2257/502
USPC ........................................................ 502/415
See application file for complete search history.

(56) References Cited

PUBLICATIONS

Peng, J., et al., "A supported Cu(I)@MIL-100(Fe) adsorbent with high CO adsorption capacity and CO/N2 selectivity," Chemical Engineering Journal 270 (2015) 282-289.
Ma, J., et al., "CO adsorption on activated carbon-supported Cu-based adsorbent prepared by a facile route," Separation and Purification Technology 76 (2010) 89-93.
Wang, F., et al., "Adsorption of carbon disulfide on activated carbon modified by Cu and cobalt sulfonated phthalocyanine," Adsorption (2015) 21:401-408.
Yoon, J.W., et al., "Controlled Reducibility of a Metal-Organic Framework with Coordinatively Unsaturated Sites for Preferential Gas Sorption," Angew. Chem. Int. Ed. 2010, 49, 5949-5952.
Xue, C., et al., "CO Adsorption Performance of CuCl/Activated Carbon by Simultaneous Reduction-Dispersion of Mixed Cu(II) Salts," Materials, 2019, 12, 1605.

*Primary Examiner* — Edward M Johnson
(74) *Attorney, Agent, or Firm* — DUANE MORRIS, LLP; Gregory M. Lefkowitz; Brandon A. Chan

(57) ABSTRACT

Disclosed is a method for producing a granular adsorbent for carbon monoxide or carbon disulfide separation. According to the method, incipient wet impregnation and sonication are performed simultaneously and the amount of an impregnation solution and the average particle diameter of a particulate adsorbent are adjusted to optimal ranges to produce a granular adsorbent that is evenly and uniformly impregnated with metal ions, achieving significantly improved carbon monoxide and carbon disulfide adsorption capacities. Also disclosed is a granular adsorbent for carbon monoxide or carbon disulfide separation produced by the method. The granular adsorbent has highly stable physical properties, does not cause problems such as pressure drop or line contamination during use, and is simple to produce because the use of a solvent such as a strong acid or base is not required during production. Also disclosed is a separator including the granular adsorbent.

17 Claims, 4 Drawing Sheets

METHOD FOR MANUFACTURING A GRANULAR ADSORBENT FOR SEPARATING CARBON MONOXIDE OR CARBON DISULFIDE

BACKGROUND OF THE INVENTION

1. Field of the Invention

The present invention relates to a method for producing a granular adsorbent for carbon monoxide or carbon disulfide separation, a granular adsorbent for carbon monoxide or carbon disulfide separation produced by the method, and a separator including the granular adsorbent.

2. Description of the Related Art

Linz-Donawitz converter gas (LDG), Finex off gas (FOG), and blast furnace gas (BFG) are by-product gases generated in the steel industry and their carbon monoxide contents are as large as about 78%, 30%, and 25%, respectively. Annual industrial by-product gas emissions are currently estimated to be 20.46 million tons of CO equivalent. However, CO is used mainly for power generation, which has low value added, due to the lack of economical processes for CO separation.

As sources of carbon monoxide become more diverse, studies have been conducted on the recovery of carbon monoxide, which can be converted to acetic acid, methanol, formic acid, and other high value-added products. Absorption, cryogenic, and adsorption processes are currently being investigated for carbon monoxide recovery. Absorption processes for carbon monoxide recovery use organic-inorganic composites as absorbents that have problems such as poor stability against moisture and hydrogen sulfide and high energy costs. Cryogenic processes for carbon monoxide recovery are suitable for large-scale applications. However, the cryogenic processes are not easy to operate and recover carbon monoxide in low purity compared to absorption and adsorption processes. Another disadvantage of the cryogenic processes is that cryogenic distillation involves high energy and plant costs. Adsorption processes for carbon monoxide recovery use adsorbents with high selectivity to carbon monoxide for carbon monoxide separation and recovery based on a pressure difference. That is, the adsorption processes are advantageous for carbon monoxide recovery in terms of energy and cost over the other two processes.

By-product gases generated in the steel industry contain large amounts of carbon dioxide and carbon monoxide and slight amounts of other gases. Thus, adsorbents used in adsorption processes for recovering carbon monoxide from by-product gases should be able to adsorb a large amount of carbon monoxide and have high selectivity to carbon monoxide over carbon dioxide. Studies have generally concentrated on Cu(I)-supported zeolite and activated carbon as adsorbents (Xue, C., Hao, W., Cheng, W., Ma, J., & Li, R. (2019). CO Adsorption Performance of CuCl/Activated Carbon by Simultaneous Reduction-Dispersion of Mixed Cu(II) Salts. Materials, 12(10), 1605.). In recent years, considerable studies have been conducted on Cu(I)-supported boehmite as adsorbents. These studies have also focused on increasing the amount of carbon monoxide adsorbed and the selectivity to carbon monoxide over carbon dioxide.

Normal wet impregnation and thermal monolayer dispersion are commonly known as processes for supporting cuprous compounds on adsorbents. According to a normal wet impregnation process, a cuprous or cupric compound is dissolved in a solvent and mixed with an adsorbent with stirring. Since the cuprous compound is not readily dissolved in an aqueous solution, a strong acid such as hydrochloric acid or a strong base such as aqueous ammonia is used as the solvent. Meanwhile, the cupric compound is well dissolved in an aqueous solution, but its use involves a subsequent process for reduction to hydrogen or carbon monoxide. According to a thermal monolayer dispersion, a cuprous compound is physically mixed with an adsorbent, followed by activating at high temperature to disperse the copper.

Particularly, all of these processes are difficult to apply to particulate adsorbents. For example, the normal wet impregnation process has the disadvantages that the inherent physical properties of the adsorbent may vary depending on the solvent used and the adsorbent may be destroyed by the stirrer during stirring of the mixed solution and the adsorbent. The thermal monolayer dispersion method is difficult to apply to particulate adsorbents because the physical mixing is performed using a ball mill. Copper is supported on adsorbents mainly by the thermal monolayer dispersion method. Most of the adsorbents produced by this method are in the form of powders. Thus, the powdery adsorbents need to be molded into granular form to be applied in actual processes.

Crude oil contains carbon disulfide at various concentrations from below 1 ppm to 300 ppm depending on its place of origin. Carbon disulfide is a chemical species whose concentration needs to be reduced up to 1 to 2 ppm because it contaminates hydrogen evolution catalysts in petrochemical processes and is converted to corrosive hydrogen sulfide.

Caustic washing is used to remove acidic contaminants and hydrogen sulfide in petrochemical processes but is not effective in removing carbon disulfide. For this reason, an additional process is required to remove carbon disulfide. Approaches to carbon disulfide removal are broadly divided into three processes: hydrotreatment, fractional distillation, and adsorption. The hydrotreatment process uses a hydrotreater and has an advantage in that other contaminants can be removed as well. However, where an existing facility is unavailable, a high installation cost is required, and a sufficient amount of hydrogen gas needs to be secured. The fractional distillation process requires a low installation cost but has disadvantages in that considerable amounts of products may be discarded, and a high operating cost is incurred. The adsorption process requires an installation cost between those required in the two previous processes. In addition, the adsorption process demands the lowest energy for regeneration and is suitable for manufacturing products containing very small amounts of carbon disulfide.

Zeolites 13X, 4A, and 5A are currently commercialized for the removal of sulfur compounds but fail to remove carbon disulfide due to their low adsorption capacities for carbon disulfide over other hydrocarbons. Adsorbents for the removal of carbon disulfide require high selectivity to carbon disulfide. Special adsorbents such as zeolites whose metal ions are exchanged with Ba are used in Korea and other countries but their low adsorption capacities still remain a problem to be solved.

SUMMARY OF THE INVENTION

One object of the present invention is to provide a method for producing a granular adsorbent for carbon monoxide or carbon disulfide separation by simultaneously performing incipient wet impregnation and sonication to achieve significantly improved carbon monoxide adsorption capacity of the final adsorbent.

A further object of the present invention is to provide a granular adsorbent for carbon monoxide or carbon disulfide separation that does not require the use of a solvent such as a strong acid or base during its production to ensure stable physical properties.

Another object of the present invention is to provide a separator including the granular adsorbent.

The present invention provides a method for producing a granular adsorbent for carbon monoxide or carbon disulfide separation, including: preparing an impregnation solution containing a metal precursor and a solvent; mixing the impregnation solution with a particulate adsorbent to prepare a mixed solution; subjecting the mixed solution simultaneously to incipient wet impregnation and sonication to impregnate a portion or the entirety of the interior or surface of the particulate adsorbent with the metal precursor; drying the particulate adsorbent impregnated with the metal precursor; and activating the dried particulate adsorbent in an inert gas to produce a granular adsorbent in which the metal precursor is reduced to metal ions.

The present invention also provides a granular adsorbent for carbon monoxide or carbon disulfide separation, including a particulate adsorbent and metal ions impregnated into a portion or the entirety of the interior or surface of the particulate adsorbent.

The present invention also provides a separator including the granular adsorbent.

According to the method of the present invention, incipient wet impregnation and sonication are performed simultaneously and the amount of the impregnation solution and the average particle diameter of the particulate adsorbent are adjusted to optimal ranges to produce a granular adsorbent for carbon monoxide or carbon disulfide separation that is evenly and uniformly impregnated with metal ions, achieving significantly improved adsorption capacities for carbon monoxide in by-product gases and carbon disulfide in liquid sulfur compounds.

In addition, the granular adsorbent for carbon monoxide or carbon disulfide separation according to the present invention has highly stable physical properties, does not cause problems such as pressure drop or line contamination during use, and is simple to produce because the use of a solvent such as a strong acid or base is not required during production.

Effects of the present invention are not limited to the above-mentioned ones. It should be understood that the effects of the present invention include all effects inferable from the following detailed description.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
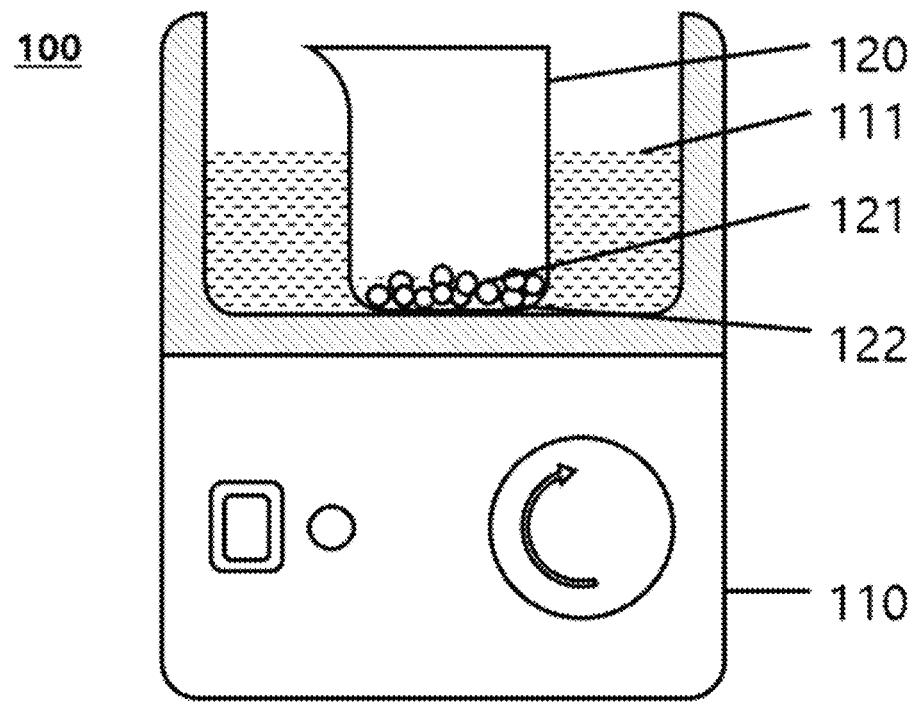
FIG. 1 schematically illustrates the constitution of an apparatus for producing a granular adsorbent for carbon monoxide or carbon disulfide separation according to the present invention.

The present invention will now be described in more detail by way of one embodiment.

The present invention is directed to a method for producing a granular adsorbent for carbon monoxide or carbon disulfide separation, a granular adsorbent for carbon monoxide or carbon disulfide separation produced by the method, and a separator including the granular adsorbent.

Normal wet impregnation or thermal monolayer dispersion is conventionally used to support a cuprous compound on an adsorbent, as described above. However, this process is difficult to apply to a particulate adsorbent. Further, a solvent such as a strong acid or base may change or destroy the inherent physical properties of the adsorbent and an additional process for molding the adsorbent into a powder is required, making the production method complicated.

In contrast, according to the method of the present invention, incipient wet impregnation and sonication are essentially performed simultaneously and the amount of an impregnation solution and the average particle diameter of a particulate adsorbent are adjusted to optimal ranges. The granular adsorbent of the present invention is evenly and uniformly impregnated with metal ions, achieving significantly improved adsorption capacities for carbon monoxide in by-product gases and carbon disulfide in liquid sulfur compounds. In addition, the granular adsorbent has highly stable physical properties, does not cause problems such as pressure drop or line contamination during use, and is simple to produce because the use of a solvent such as a strong acid or base is not required during production.

Specifically, the present invention provides a method for producing a granular adsorbent for carbon monoxide or carbon disulfide separation, including: (S1) preparing an impregnation solution containing a metal precursor and a solvent; (S2) mixing the impregnation solution with a particulate adsorbent to prepare a mixed solution; (S3) subjecting the mixed solution simultaneously to incipient wet impregnation and sonication to impregnate a portion or the entirety of the interior or surface of the particulate adsorbent with the metal precursor; (S5) drying the particulate adsorbent impregnated with the metal precursor; and (S6) annealing the dried particulate adsorbent in an inert gas to produce a granular adsorbent in which the metal precursor is reduced to metal ions.

A detailed description will be given regarding the individual steps of the method according to the present invention.

(S1) Preparation of Impregnation Solution

In (S1), an impregnation solution containing a metal precursor and a solvent is prepared. The metal precursor may contain one or more metals selected from the group consisting of copper, nickel, chromium, molybdenum, palladium, rubidium, and barium. Preferably, the metal precursor contains copper, nickel or a mixture thereof. Most preferably, the metal precursor is a copper precursor.

Particularly, the metal precursor is a copper precursor that can be converted to copper ions upon impregnation into a particulate adsorbent and subsequent annealing. The copper ions can greatly improve the selectivity of a final adsorbent to carbon monoxide due to their high carbon monoxide adsorption capacity. A conventional adsorbent for carbon monoxide separation generally uses cuprous ions with high adsorption performance. However, CuCl as a copper precursor containing cuprous ions is not readily soluble in water and is dissolved only in a strong acid (e.g., HCl). Accordingly, the production of the adsorbent is currently limited to wet impregnation using a strong acid instead of water. The use of the strong acid deteriorates the to stability of the adsorbent. Further, since the copper precursor is not sufficiently impregnated into the adsorbent, the use of an excess of the copper precursor is required, leading to a high production cost.

In contrast, according to the method of the present invention, incipient wet impregnation and sonication are performed simultaneously such that a copper precursor containing cupric ions is evenly impregnated into the interior or surface of a particulate adsorbent, followed by annealing to reduce the cupric ions to cuprous ions.

To overcome the limitations of a copper precursor containing cuprous ions, the method of the present invention uses a copper precursor containing cupric ions. The copper precursor is selected from the group consisting of $CuCl_2$, $Cu(HCOO)_2$, $Cu(NO_3)_2$, and mixtures thereof. The copper precursor is preferably a mixture of $CuCl_2$ and $Cu(HCOO)_2$. Particularly, a mixture of $CuCl_2$ and $Cu(HCOO)_2$ as the copper precursor is reduced to generate more cuprous ions in a mixed solution prepared in the subsequent step, compared to $CuCl_2$ or $Cu(HCOO)_2$ alone.

The solvent may be selected from the group consisting of water, toluene, ethyl acetate, acetonitrile, and mixtures thereof. The solvent is preferably water, toluene or a mixture thereof, most preferably water.

(S2) Preparation of Mixed Solution

In (S2), the impregnation solution is mixed with a particulate adsorbent to prepare a mixed solution.

The particulate adsorbent has a larger average particle diameter than conventional micro-sized powder adsorbents, can considerably prevent the occurrence of a pressure drop when used in a packed tower, and is easy to regenerate after use. In addition, the particulate adsorbent has a large pore surface area and has a small pore size, ensuring its ability to adsorb low molecular weight materials such as carbon monoxide rather than high molecular weight impurities.

That is, the particulate adsorbent has a high carbon monoxide adsorption capacity and is highly stable. Due to these advantages, the particulate adsorbent does not cause any problems such as pressure drop or line contamination even when directly applied to processes.

The particulate adsorbent may be selected from the group consisting of activated carbon, activated alumina, activated zeolite, activated clay, activated bentonite, activated diatomite, activated silica, and mixtures thereof. The particulate adsorbent is preferably selected from the group consisting of activated carbon, activated alumina, activated zeolite, and mixtures thereof, more preferably activated carbon, activated alumina or a mixture thereof, most preferably activated carbon.

The particulate adsorbent has an average particle diameter of 250 to 5000 μm, preferably 300 to 2000 μm, more preferably 400 to 1000 μm, most preferably 450 to 800 μm. The granular adsorbent has a pore size of 0.1 to 50 nm, preferably 0.2 to 40 nm, more preferably 0.3 to 10 nm, most preferably 0.5 to 3 nm. If the adsorbent has an average particle diameter of less than 250 μm or a pore size of less than 0.1 nm, the adsorbent particles tend to agglomerate due to their too small size, resulting in poor dispersibility. Meanwhile, if the adsorbent has an average particle diameter exceeding 5000 μm or a pore size exceeding 50 nm, the development of micropores deteriorates, resulting in low adsorption capacity.

In this step, the volume of the impregnation solution mixed with the particulate adsorbent is 0.5 to 1.5 ml, preferably 0.75 to 1.25 ml, most preferably 0.9 to 1.1 ml per unit mass of the particulate adsorbent. If the volume of the impregnation solution is less than 0.5 ml, the impregnation solution may be completely evaporated before the metal precursor in the impregnation solution is evenly distributed in the particulate adsorbent, and as a result, the bulk metal precursor may be non-uniformly impregnated into the particulate adsorbent. Meanwhile, if the volume of the impregnation solution exceeds 1.5 ml, the metal precursor in the impregnation solution may be excessively impregnated into the particulate adsorbent, resulting in an excessive increase in the average particle size of the adsorbent.

S3) Impregnation of the Particulate Adsorbent with the Metal Precursor

In (S3), the mixed solution is subjected simultaneously to incipient wet impregnation and sonication to impregnate a portion or the entirety of the interior or surface of the particulate adsorbent with the metal precursor.

According to a normal wet impregnation process, the particulate adsorbent may be broken by a magnetic bar used to mix with the impregnation solution before the metal precursor in the impregnation solution is completely impregnated into the particulate adsorbent. Another problem is slow impregnation with the metal precursor because it takes a very long time for the metal precursor to diffuse into pores of the adsorbent. Particularly, the normal wet impregnation process uses an excess of the solvent compared to the amount of the adsorbent used. The use of the excess solvent leads to a low concentration of the metal precursor, and as a result, the metal precursor is slowly delivered into the adsorbent. That is, the normal wet impregnation process has a limitation in increasing the impregnation amount and rate of the metal precursor.

In contrast, incipient wet impregnation and sonication is performed simultaneously in the present invention to significantly increase the impregnation amount and rate of the metal precursor. Particularly, the incipient wet impregnation uses a reduced amount of the solvent. The use of a reduced amount of the solvent leads to a high concentration of the metal precursor, which increases the mass transfer rate of the metal precursor in pores of the adsorbent. In addition, the incipient wet impregnation enables accurate control over the amount of the metal precursor impregnated into the adsorbent because the impregnation proceeds until complete vaporization of the solvent.

The sonication serves to induce the metal precursor to be quickly and evenly impregnated into a portion or the entirety of the interior or surface of the particulate adsorbent, achieving improved dispersibility of the metal precursor. Excessive impregnation of the metal precursor makes the metal precursor bulk. In this case, the sonication can be performed to prevent the bulk metal precursor from being impregnated into the particulate adsorbent. Preferably, the sonication allows the metal precursor to be evenly impregnated into the entirety of the interior of the particulate adsorbent.

The incipient wet impregnation and the sonication are performed simultaneously at a temperature of 10 to 100° C., preferably 30 to 90° C., more preferably 40 to 80° C., most preferably 55 to 75° C. until the solvent in the mixed solution is completely vaporized and only the particulate adsorbent remains impregnated with the metal precursor. If the temperature is lower than 10° C., the mass transfer rate of the metal precursor to the particulate adsorbent may be slowed down, resulting in insufficient impregnation with the metal precursor, and the dispersibility of the metal precursor may be considerably deteriorated. Meanwhile, if the temperature exceeds 100° C., the solvent may be completely vaporized before the metal precursor reaches micropores of the particulate adsorbent through the solvent and the dispersibility of the metal precursor may be considerably deteriorated.

S5) Drying of the Particulate Adsorbent Impregnated with the Metal Precursor

In (S5), the particulate adsorbent impregnated with the metal precursor is dried to completely remove the solvent present in some pores of the adsorbent before subsequent annealing. The drying may be performed at a temperature of 100 to 250° C. for 1 to 24 hours, preferably at a temperature of 110 to 200° C. for 3 to 18 hours, most preferably at a temperature of 120 to 150° C. for 6 to 12 hours.

S6) Production of Granular Adsorbent

In (S6), the dried particulate adsorbent is annealed in an inert gas to produce a granular adsorbent in which the metal precursor is reduced to metal ions. The annealing may be performed in an inert gas at 200 to 600° C. for 1 to 12 hours, preferably at a temperature of 300 to 500° C. for 7 to 10 hours, most preferably at a temperature of 350 to 450° C. for 7.5 to 8.5 hours. Particularly, if the annealing temperature is lower than 200° C. or the annealing time is shorter than 6 hours, the metal precursor is not completely reduced to metal ions and remains unreacted in the adsorbent, resulting in poor carbon monoxide adsorption capacity. Meanwhile, if the annealing temperature exceeds 600° C. or the annealing time exceeds 12 hours, internal active sites of the particulate adsorbent may be removed, resulting in low adsorption capacity.

The inert gas is selected from the group consisting of nitrogen, argon, helium, krypton, xenon, and mixtures thereof, preferably nitrogen, argon or a mixture thereof, most preferably nitrogen.

The metal ions are selected from the group consisting of copper ions, nickel ions, chromium ions, molybdenum ions, palladium ions, rubidium ions, barium ions, and mixtures thereof, preferably copper ions, nickel ions or a mixture thereof, most preferably copper ions.

The amount of the metal ions impregnated into the particulate adsorbent is 3.5 to 4.5 mmol, preferably 3.8 to 4.3 mmol, more preferably 3.9 to 4.1 mmol, most preferably 4 mmol per unit mass of the particulate adsorbent. The unit mass of the granular adsorbent may be expressed in gram (g). If the impregnation amount of the metal ions is less than 3.5 mmol, the carbon monoxide adsorption capacity may be greatly reduced. Meanwhile, if the impregnation amount of the metal ions exceeds 4.5 mmol, the metal precursor may be in a bulk state, resulting in poor dispersibility, and the number of effective adsorption effective sites may decrease, resulting in low adsorption capacity.

Particularly, although not explicitly described in the Examples section that follows, granular adsorbents for carbon monoxide or carbon disulfide separation were produced using particulate adsorbents having an average particle diameter of 450 to 800 μm and a pore size of 0.5 to 3 nm, different amounts of impregnation solutions, and different amounts of metal ions impregnated into the particulate adsorbents. The carbon monoxide and carbon disulfide adsorption and separation performances of each of the granular adsorbents in by-product gases and liquid sulfur compounds were analyzed for 150 hours, respectively.

As a result, when the following conditions were all met, the granular adsorbents showed high selectivity to carbon monoxide in the by-product gases and carbon disulfide in the liquid sulfur compounds and had significantly improved adsorption and separation performances even compared to existing carbon monoxide adsorbents, unlike when other conditions and other numerical ranges were employed.

(1) Each of the particulate adsorbents has an average particle diameter of 450 to 800 μm and a pore size of 0.5 to 3 nm, (2) the amount of the impregnation solution mixed with the particulate adsorbent is 0.75 to 1.25 ml per unit mass of the particulate adsorbent, and (3) the amount of the metal ions impregnated into the particulate adsorbent is 3.8 to 4.3 mmol per unit mass of the particulate adsorbent.

The granular adsorbents were also found to be maintained evenly dispersed while preventing metal ions from escaping after the adsorption tests for 150 hours.

When any one of the above three conditions was not met, the selectivities of the granular adsorbents to carbon monoxide and carbon disulfide were low and some of the metal ions were found to be lost from the granular adsorbents after completion of the reactions for 150 hours, resulting in poor carbon monoxide and carbon disulfide adsorption and separation performances.

Particularly, although not explicitly described in the Examples section that follows, granular adsorbents for carbon monoxide or carbon disulfide separation were produced by varying the following conditions and their monoxide adsorption and separation performances were analyzed at 1 to 10 atm for 300 hours.

As a result, when the following conditions were all met, the amounts of carbon monoxide adsorbed on and desorbed from each of the granular adsorbents were 2.8 g and 2.7 g per gram of the adsorbent, respectively, which were maintained at remarkably high levels for a long time, unlike when other conditions and other numerical ranges were employed. Carbon monoxide was selectively recovered in a high purity of at least 99.96%.

(1) The metal precursor is a copper precursor and the copper precursor is a mixture of $CuCl_2$ and $Cu(HCOO)_2$, (2) the solvent is water, (3) the particulate adsorbent is activated carbon, (4) the particulate adsorbent has an average particle diameter of 450 to 800 μm and a pore size of 0.5 to 3 nm, (5) the amount of the impregnation solution mixed with the particulate adsorbent is 0.9 to 1.1 ml per unit mass of the particulate adsorbent, (6) the incipient wet impregnation and sonication are performed simultaneously until the solvent in the mixed solution is completely vaporized at a temperature of 55 to 75° C. and only the particulate adsorbent remains impregnated with the metal precursor, (7) the drying is performed at a temperature of 120 to 150° C. for 6 to 12 hours, (8) the annealing is performed at 350 to 450° C. for 7.5 to 8.5 hours, and (9) the metal ions are impregnated in an amount of 3.8 to 4.3 mmol per unit mass of the particulate adsorbent.

When any one of the above nine conditions was not met, the amounts of carbon monoxide adsorbed on and desorbed from each of the granular adsorbents were as very small as 1 g and 0.8 g per gram of the adsorbent, respectively, which were not maintained for a long time. The purity of carbon monoxide recovered was low (87.4%).

FIG. 1 schematically illustrates the constitution of an apparatus for producing a granular adsorbent of the present invention. Referring to FIG. 1, both a reactor 120 for incipient wet impregnation and a sonicator 110 are arranged, a particulate adsorbent 122 and an impregnation solution 121 are present in the reactor 120, and water 111 for sonication is located outside the reactor 120.

At the initial stage for simultaneous incipient wet impregnation and sonication in the reactor 120, the particulate adsorbent 122 is allowed to be completely submerged in the impregnation solution 121. Therefore, when incipient wet impregnation and sonication are performed simultaneously, the solvent begins to be slowly vaporized from the impregnation solution. The incipient wet impregnation and the sonication are continued until the solvent is completely vaporized and only the adsorbent remains, as shown in FIG. 1.

The present invention also provides a granular adsorbent for carbon monoxide or carbon disulfide separation, including a particulate adsorbent and metal ions impregnated into a portion or the entirety of the interior or surface of the particulate adsorbent.

The particulate adsorbent may be selected from the group consisting of activated carbon, activated alumina, activated zeolite, activated clay, activated bentonite, activated diatomite, activated silica, and mixtures thereof. The particulate adsorbent is preferably selected from the group consisting of activated carbon, activated alumina, activated zeolite, and mixtures thereof, more preferably activated carbon, activated alumina or a mixture thereof, most preferably activated carbon.

The metal ions are selected from the group consisting of copper ions, nickel ions, chromium ions, molybdenum ions, palladium ions, rubidium ions, barium ions, and mixtures thereof, preferably copper ions, nickel ions or a mixture thereof, most preferably copper ions.

The impregnation amount of the metal ions is 3.5 to 4.5 mmol per unit mass of the particulate adsorbent.

Particularly, although not explicitly described in the Examples section that follows, granular adsorbents for carbon monoxide or carbon disulfide separation were produced, which had an average particle diameter of 450 to 800 µm and a pore size of 0.5 to 3 nm and included 3.5 to 4.5 mmol of metal ions impregnated into a particulate adsorbent per unit mass of the particulate adsorbent. When these conditions were all met, no pressure drop occurred in a tower filled with the particulate adsorbent and lines were protected from being contaminated with dust, unlike when the conditions were not met.

When any one of the above conditions for the average particle size and pore size of the granular adsorbents and the impregnation amount of the metal ions was not met, an excessive pressure drop occurred and lines were contaminated with heavy dust.

Particularly, although not explicitly described in the Examples section that follows, granular adsorbents for carbon monoxide or carbon disulfide separation were produced, which had an average particle diameter of 450 to 800 µm and a pore size of 0.5 to 3 nm and included 3.8 to 4.3 mmol of copper ions as metal ions impregnated into the entirety of the interior of a particulate adsorbent per unit mass of the particulate adsorbent. When these conditions were all met, significantly improved carbon monoxide and carbon disulfide adsorption performances were achieved, unlike when the conditions were not met.

When any one of the above conditions for the average particle size and pore size of the granular adsorbents and the kind and impregnation amount of the metal ions was not met, either the carbon monoxide adsorption performance or the carbon disulfide adsorption performance was lowered, and as a result, simultaneous improvements in the carbon monoxide adsorption performance and the carbon disulfide adsorption performance could not be expected.

The particulate adsorbent has an average particle diameter of 250 to 5000 µm, preferably 300 to 2000 µm, more preferably 400 to 1000 µm, most preferably 450 to 800 µm. The particulate adsorbent has a pore size of 0.1 to 50 nm, preferably 0.2 to 40 nm, more preferably 0.3 to 10 nm, most preferably 0.5 to 3 nm.

Most preferably, the metal ions are copper ions, are impregnated into the entirety of the interior of the particulate adsorbent, and are impregnated in an amount of 3.8 to 4.3 mmol per unit mass of the particulate adsorbent.

The granular adsorbent adsorbs 28 to 53 ml, preferably 29.683 to 51.413 ml of carbon monoxide per gram of the adsorbent at a temperature of 25° C. and a pressure of 101.325 kPa.

The present invention also provides a separator including the granular adsorbent.

The separator may be a gas or liquid separator, preferably a carbon monoxide or carbon disulfide separator.

The present invention will be explained in more detail with reference to the following examples but is not limited to these examples.

Examples 1-6 and Comparative Examples 1-4

Activated carbon having an average particle diameter of 750 µm (Company A) and a pore size of 2 nm and activated carbon having an average particle diameter of 800 µm and a pore size of 2.5 nm (Company B) were used as particulate adsorbents. A mixture of $CuCl_2$ and $Cu(HCOO)_2$ in a 1:1 weight ratio was used as a copper precursor. First, the copper precursor was mixed with water to prepare a copper precursor impregnation solution. Then, the particulate adsorbent was submerged in the impregnation solution, followed by stirring to prepare a mixed solution. The mixing ratio of the impregnation solution and the particulate adsorbent is shown in Table 1. Then, the mixed solution was subjected to incipient wet impregnation simultaneously with sonication in a sonicator at 60° C. for 1 h. The impregnation solution was added only in an amount sufficient to submerge the particulate adsorbent. After the incipient wet impregnation and sonication started, the water began to be vaporized from the impregnation solution. The incipient wet impregnation and the sonication were performed until the solvent was completely vaporized and only the particulate adsorbent remained impregnated with the copper precursor. The particulate adsorbent adsorbed by the copper precursor was dried at 120° C. for 7 h, followed by annealing under a flow of nitrogen at 400° C. for 8 h to reduce the copper precursor to copper ions. As a result, a granular adsorbent for carbon monoxide or carbon disulfide separation was produced in which the copper ions were adsorbed on the entirety of the interior of the particulate adsorbent.

TABLE 1

| Example No. | Impregnation process | Impregnation solution/particulate adsorbent ratio | Content of Cu in granular adsorbent |
| --- | --- | --- | --- |
| Example 1 | Incipient wet impregnation + sonication | 1 ml solution/1 g AC | 1 mmol Cu/1 g AC |
| Example 2 | Incipient wet impregnation + sonication | 1.5 ml solution/1 g AC | 4 mmol Cu/1 g AC |
| Comparative Example 1 | Incipient wet impregnation | — | 1 mmol Cu/1 g AC |
| Comparative Example 2 | Wet impregnation | — | 3 mmol Cu/1 g AC |
| Comparative Example 3 | Wet impregnation | — | 4 mmol Cu/1 g AC |
| Example 3 | Incipient wet impregnation + sonication | 1 ml solution/1 g AC | 3 mmol Cu/1 g AC |
| Example 4 | Incipient wet impregnation + sonication | 1 ml solution/1 g AC | 3.5 mmol Cu/1 g AC |
| Example 5 | Incipient wet impregnation + sonication | 1 ml solution/1 g AC | 4 mmol Cu/1 g AC |
| Example 6 | Incipient wet impregnation + sonication | 1 ml solution/1 g AC | 4.5 mmol Cu/1 g AC |
| Comparative Example 4 | Commercially available granular adsorbent (activated carbon) | | |

Experimental Example 1: Analysis of Amounts of Carbon Monoxide Adsorbed Depending on the Impregnation Processes Used The amounts of carbon monoxide adsorbed on the granular adsorbents produced using different impregnation processes in Examples 1-2 and Comparative Examples 1-3 were analyzed. The results are shown in Table 2 and FIG. 2.

Figure 2:
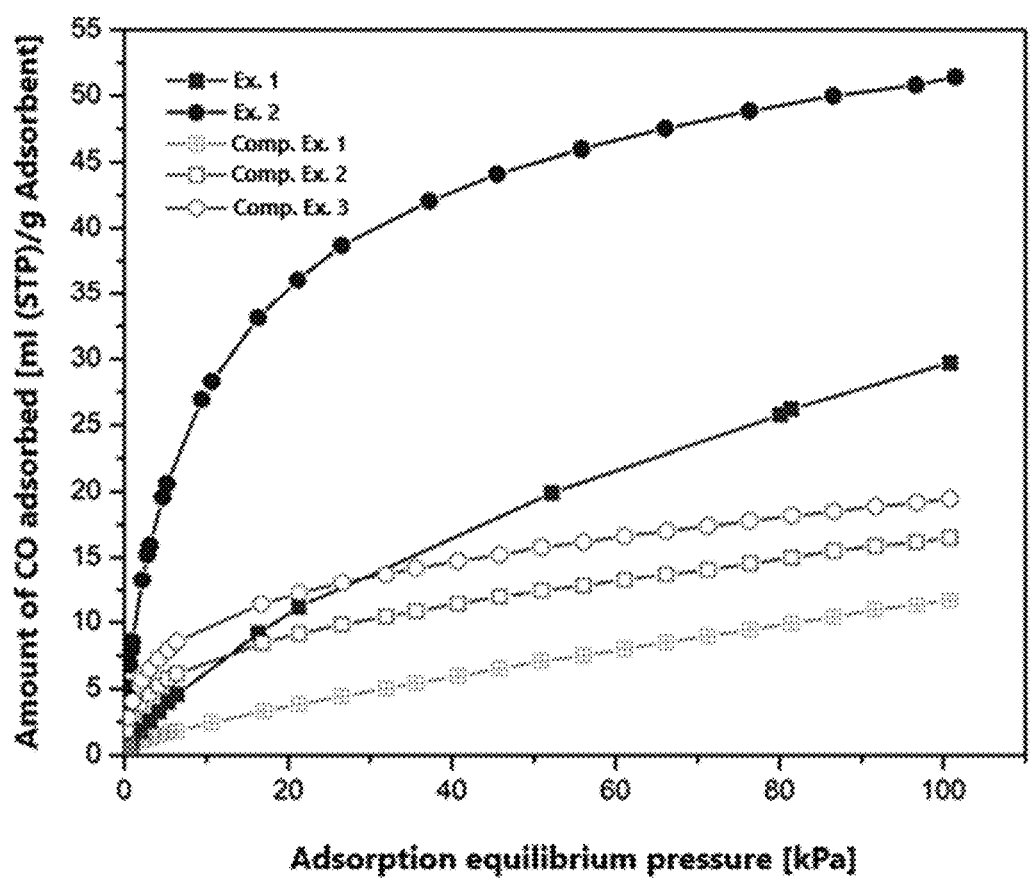
FIG. 2 shows the amounts of CO adsorbed on granular adsorbents produced in Examples 1 and 2 and Comparative Examples 1 to 3 under different adsorption equilibrium pressures.

FIG. 2 shows the amounts of CO adsorbed on the granular adsorbents produced in Examples 1 and 2 and Comparative Examples 1 to 3 under different adsorption equilibrium pressures.

TABLE 2

| Example No. | Amount of CO adsorbed at 101.325 kPa (m/$g_{adsorbent}$) |
| --- | --- |
| Example 1 | 29.683 |
| Example 2 | 51.412 |
| Comparative Example 1 | 11.682 |
| Comparative Example 2 | 16.486 |
| Comparative Example 3 | 19.443 |

As can be seen from the results in FIG. 2 and Table 2, copper ions were uniformly impregnated into the particulate adsorbents in the granular adsorbents of Examples 1 and 2, and as a result, the amounts of CO adsorbed on the granular adsorbents of Examples 1-2 under different adsorption equilibrium pressures were 1.8-2.6 times larger than those on the granular adsorbents of Comparative Examples 1-3.

Most copper ions were not impregnated into the particulate adsorbents in the granular adsorbents of Comparative Examples 1-3, where wet impregnation or incipient wet impregnation was performed alone, even after a long time has passed, resulting in very low CO adsorption.

Experimental Example 2: Analysis of Amounts of Carbon Monoxide Adsorbed on Different Types of Adsorbents Depending on Content of the Impregnation Solution The amounts of carbon monoxide adsorbed on the granular adsorbents produced in Examples 1-5 depending on the content of the impregnation solution were analyzed. The results are shown in FIG. 3.

Figure 3:
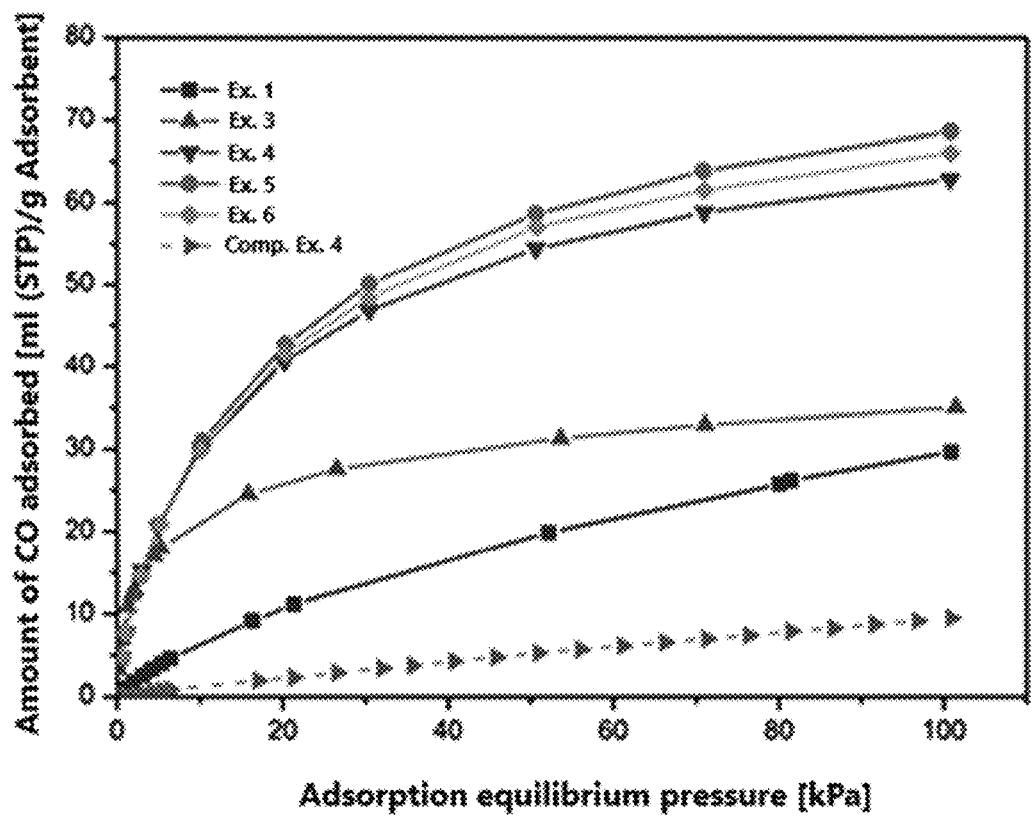
FIG. 3 shows the amounts of CO adsorbed on granular adsorbents produced in Examples 1 and 3 to 6 and Comparative Example 4 under different adsorption equilibrium pressures.

FIG. 3 shows the amounts of CO adsorbed on the granular adsorbents produced in Examples 1 and 3 to 6 and the granular adsorbent of Comparative Example 4 under different adsorption equilibrium pressures. As can be seen from the results in FIG. 3, the granular adsorbents of Examples 4-6, which had average particle diameters of 750-800 μm and pore sizes of 2-2.5 nm and included 3.5-4.5 mmol Cu/1 g AC, adsorbed significantly larger amounts of CO, than the granular adsorbents of Examples 1 and 3 and Comparative Example 4. Particularly, the granular adsorbent of Example 5 containing 4 mmol Cu/1 g AC was found to adsorb the largest amount of CO. These results concluded that when the average particle size and pore size of the granular adsorbent are within the respective ranges defined above and the copper content of the granular adsorbent is controlled to the range defined above, the amount of CO adsorbed on the granular adsorbent can be increased and optimized.

Experimental Example 3: Analysis of Amount of Carbon Disulfide Detected

The content of carbon disulfide adsorbed on the granular adsorbent produced in Example 5 was analyzed by a suitable method known in the art. Specifically, 0.5 g of the granular adsorbent was added to 5 mL of a mixed solution containing 200 ppm of sulfur compounds and allowed to stand at 4° C. for 72 h. The mixed solution was composed of 36 wt % of normal paraffins, 61 wt % of total isoparaffins, 1.8 wt % of naphthenes, 0.7 wt % of aromatics, and 0.5 wt % of olefins. Carbon disulfide was present in the largest amount in the sulfur compounds.

After removal of the granular adsorbent from the mixed solution, the concentrations of the sulfur compounds in the solution were measured. As a result, carbon disulfide was detected at a concentration of ≤5 ppm. That is, the granular adsorbent selectively adsorbed a large amount of carbon disulfide in the liquid sulfur compounds, and as a result, only a very small amount (≤5 ppm) of carbon disulfide was detected in the mixed solution after adsorption.

In conclusion, the granular adsorbent can selectively adsorb not only gaseous carbon monoxide but also liquid carbon disulfide and can be used separate and remove these components.

Experimental Example 4: Analysis of Breakthrough Ability of Carbon Monoxide

Figure 4:
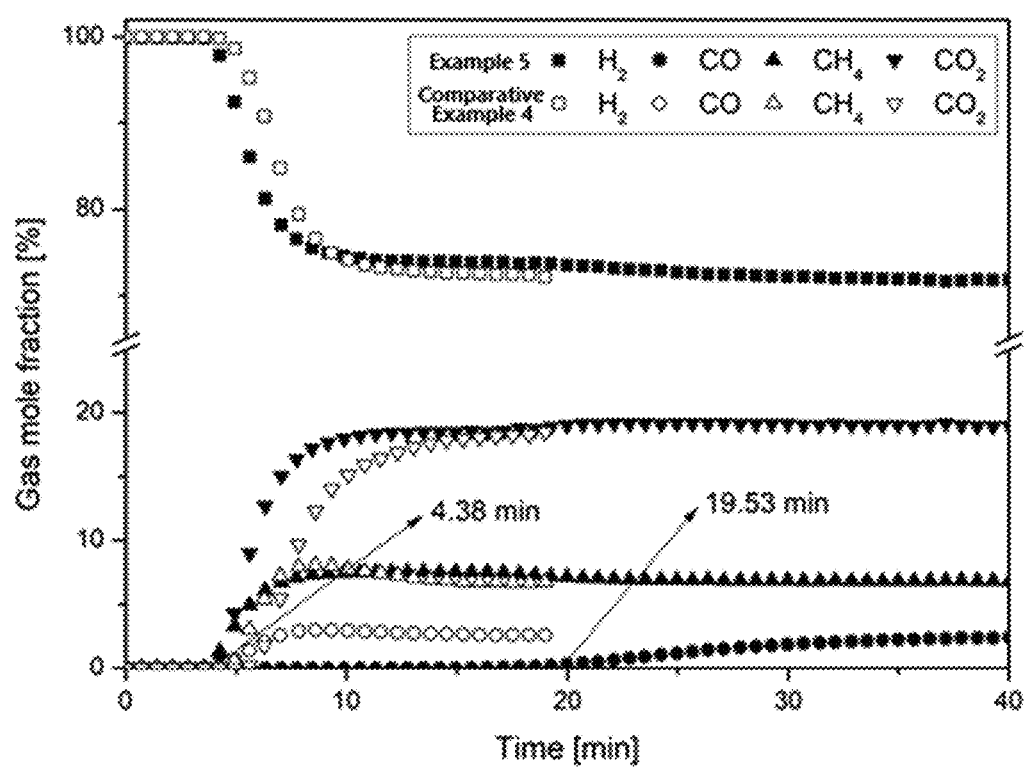
FIG. 4 shows breakthrough curves of a mixed gas in an adsorption tower filled with a granular adsorbent produced in Example 5 and an adsorption tower filled with a commercially available granular adsorbent of Comparative Example 4 over time.

The abilities of carbon monoxide in a mixed gas to break through the granular adsorbent produced in Example 5 and the commercial granular adsorbent of Comparative Example 4 unimpregnated with copper were analyzed. The results are shown in FIG. 4. The composition of the mixed gas is shown in Table 3.

TABLE 3

| Constituent gas | Gas proportion (%) |
|---|---|
| $H_2$ | 72.31 |
| CO | 2.59 |
| $CH_4$ | 6.7 |
| $CO_2$ | 18.4 |

Specifically, the granular adsorbent produced in Example 5 and the commercial granular adsorbent of Comparative Example 4 unimpregnated with Cu were filled to heights of 4.5 cm in different 0.7-cm-diameter towers. The mixed gas was allowed to flow through each column at a rate of 30 ml/min for 40 min. The breakthrough abilities of carbon monoxide over time were analyzed.

FIG. 4 shows breakthrough curves of the mixed gas in the adsorption tower filled with the granular adsorbent produced in Example 5 and the adsorption tower filled with the commercially available granular adsorbent of Comparative Example 4 over time.

Referring to the results in FIG. 4, it took 4.38 min for carbon monoxide to break through the granular adsorbent of Comparative Example 4 unimpregnated with Cu. In contrast, it took 19.53 min for carbon monoxide to break through the granular adsorbent of Example 5. These results demonstrated that the granular adsorbent of Example 5 can adsorb a larger amount of CO than the commercial granular adsorbent of Comparative Example 4. No pressure drop occurred in the tower filled with the granular adsorbent of Example 5 and lines were protected from being contaminated with dust.

In the breakthrough experiment on the commercial granular adsorbent of Comparative Example 4, the breakthrough time of carbon monoxide was similar to that of carbon dioxide, failing to separate the two gases. In contrast, the breakthrough experiment on the granular adsorbent of Example 5 revealed that the breakthrough time of carbon monoxide was significantly different from that of carbon dioxide, facilitating separation of the two gases.

From these results, it could be concluded that the inventive granular adsorbent has a high carbon monoxide adsorption capacity compared to the commercial adsorbent and can selectively adsorb carbon monoxide over carbon dioxide, making it possible to separate and remove these gases.

What is claimed is:

1. A method for producing a granular adsorbent for carbon monoxide or carbon disulfide separation, comprising: preparing an impregnation solution containing a metal precursor and a solvent; mixing the impregnation solution with a particulate adsorbent to prepare a mixed solution; subjecting the mixed solution simultaneously to incipient wet impregnation and sonication to impregnate a portion or the entirety of the interior or surface of the particulate adsorbent with the metal precursor; drying the particulate adsorbent impregnated with the metal precursor; and annealing the dried particulate adsorbent in an inert gas to produce a granular adsorbent in which the metal precursor is reduced to metal ions;

wherein the metal precursor comprises one or more metals selected from the group consisting of copper, nickel, chromium, molybdenum, palladium, rubidium, and barium; and wherein at least one of the following is true:

(i) the particulate adsorbent has an average particle diameter of 250 to 5000 µm and a pore size of 0.1 to 50 nm;

(ii) the volume of the impregnation solution mixed with the particulate adsorbent is 0.5 to 1.5 ml per unit mass of the particulate adsorbent;

(iii) the incipient wet impregnation and the sonication are performed simultaneously at a temperature of 10 to 100° C. until the solvent in the mixed solution is completely vaporized and only the particulate adsorbent remains impregnated with the metal precursor;

(iv) the drying is performed at a temperature of 100 to 250° C. for 1 to 24 hours;

(v) the annealing is performed at 200 to 300° C. for 6 to 12 hours; or (vi) the amount of the metal ions impregnated into the particulate adsorbent is 3.5 to 4.5 mmol per unit mass of the particulate adsorbent.

2. The method according to claim 1, wherein the metal precursor is a copper precursor and the copper precursor is selected from the group consisting of $CuCl_2$, $Cu(HCOO)_2$, $Cu(NO_3)_2$, and mixtures thereof.

3. The method according to claim 1, wherein the solvent is water.

4. The method according to claim 1, wherein the particulate adsorbent is selected from the group consisting of activated carbon, activated alumina, activated zeolite, activated clay, activated bentonite, activated diatomite, activated silica, and mixtures thereof.

5. The method according to claim 1, wherein the particulate adsorbent has an average particle diameter of 250 to 5000 µm and a pore size of 0.1 to 50 nm.

6. The method according to claim 1, wherein the volume of the impregnation solution mixed with the particulate adsorbent is 0.5 to 1.5 ml per unit mass of the particulate adsorbent.

7. The method according to claim 1, wherein the incipient wet impregnation and the sonication are performed simultaneously at a temperature of 10 to 100° C. until the solvent in the mixed solution is completely vaporized and only the particulate adsorbent remains impregnated with the metal precursor.

8. The method according to claim 1, wherein the drying is performed at a temperature of 100 to 250° C. for 1 to 24 hours.

9. The method according to claim 1, wherein the annealing is performed at 200 to 300° C. for 6 to 12 hours.

10. The method according to claim 1, wherein the amount of the metal ions impregnated into the particulate adsorbent is 3.5 to 4.5 mmol per unit mass of the particulate adsorbent.

11. A method for producing a granular adsorbent for carbon monoxide or carbon disulfide separation, comprising: preparing an impregnation solution containing a metal precursor and a solvent; mixing the impregnation solution with a particulate adsorbent to prepare a mixed solution; subjecting the mixed solution simultaneously to incipient wet impregnation and sonication to impregnate a portion or the entirety of the interior or surface of the particulate adsorbent with the metal precursor; drying the particulate adsorbent impregnated with the metal precursor; and annealing the dried particulate adsorbent in an inert gas to produce a granular adsorbent in which the metal precursor is reduced to metal ions;
    wherein the metal precursor comprises one or more metals selected from the group consisting of copper, nickel, chromium, molybdenum, palladium, rubidium, and barium;
    wherein the particulate adsorbent has an average particle diameter of 450 to 800 μm and a pore size of 0.5 to 3 nm, the amount of the impregnation solution mixed with the particulate adsorbent is 0.75 to 1.25 ml per unit mass of the particulate adsorbent, and the amount of the metal ions impregnated into the particulate adsorbent is 3.8 to 4.3 mmol per unit mass of the particulate adsorbent.

12. A method for producing a granular adsorbent for carbon monoxide or carbon disulfide separation, comprising: preparing an impregnation solution containing a metal precursor and a solvent; mixing the impregnation solution with a particulate adsorbent to prepare a mixed solution; subjecting the mixed solution simultaneously to incipient wet impregnation and sonication to impregnate a portion or the entirety of the interior or surface of the particulate adsorbent with the metal precursor; drying the particulate adsorbent impregnated with the metal precursor; and annealing the dried particulate adsorbent in an inert gas to produce a granular adsorbent in which the metal precursor is reduced to metal ions;
    wherein the metal precursor is a copper precursor, the copper precursor is a mixture of $CuCl_2$ and $Cu(HCOO)_2$, the solvent is water, the particulate adsorbent is activated carbon, the particulate adsorbent has an average particle diameter of 450 to 800 μm and a pore size of 0.5 to 3 nm, the amount of the impregnation solution mixed with the particulate adsorbent is 0.9 to 1.1 ml per unit mass of the particulate adsorbent, the incipient wet impregnation and sonication are performed simultaneously until the solvent in the mixed solution is completely vaporized at a temperature of 55 to 75° C. and only the particulate adsorbent remains impregnated with the metal precursor, the drying is performed at a temperature of 120 to 150° C. for 6 to 12 hours, the annealing is performed at 350 to 450° C. for 7.5 to 8.5 hours, and the metal ions are impregnated in an amount of 3.8 to 4.3 mmol per unit mass of the particulate adsorbent.

13. The method of claim 1, wherein at least two of conditions (i) to (vi) are true.

14. The method of claim 1, wherein at least three of conditions (i) to (vi) are true.

15. The method of claim 1, wherein at least four of conditions (i) to (vi) are true.

16. The method of claim 1, wherein at least five of conditions (i) to (vi) are true.

17. The method of claim 1, wherein each of conditions (i) to (vi) is true.

* * * * *